US009069675B2

(12) United States Patent
Greiner et al.

(10) Patent No.: US 9,069,675 B2
(45) Date of Patent: *Jun. 30, 2015

(54) CREATING A PROGRAM PRODUCT OR SYSTEM FOR EXECUTING AN INSTRUCTION FOR PRE-FETCHING DATA AND RELEASING CACHE LINES

(71) Applicant: International Business Machines Corporation, Armonk, NY (US)

(72) Inventors: Dan F Greiner, San Jose, CA (US); Timothy J Slegel, Staatsburg, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/221,869

(22) Filed: Mar. 21, 2014

(65) Prior Publication Data

US 2014/0208040 A1 Jul. 24, 2014

Related U.S. Application Data

(63) Continuation of application No. 13/344,636, filed on Jan. 6, 2012, now Pat. No. 8,683,138.

(51) Int. Cl.
*G06F 12/08* (2006.01)
*G06F 9/30* (2006.01)
*G06F 9/38* (2006.01)

(52) U.S. Cl.
CPC .......... *G06F 12/0862* (2013.01); *G06F 9/3832* (2013.01); *G06F 9/30047* (2013.01); *G06F 9/383* (2013.01); *G06F 2212/6028* (2013.01)

(58) Field of Classification Search
CPC ............ G06F 12/0862; G06F 9/30047; G06F 9/3832; G06F 9/383
USPC .................. 711/130, 125, 137, 141, E12.057; 712/207
See application file for complete search history.

(56) References Cited

U.S. PATENT DOCUMENTS

| 5,623,632 | A | 4/1997 | Liu et al. |
|---|---|---|---|
| 5,678,026 | A | 10/1997 | Vartti et al. |
| 5,765,208 | A | 6/1998 | Nelson et al. |
| 5,944,815 | A * | 8/1999 | Witt ............................. 712/207 |
| 6,128,706 | A | 10/2000 | Bryg et al. |
| 6,321,326 | B1 | 11/2001 | Witt |
| 6,560,693 | B1 | 5/2003 | Puzak et al. |
| 6,625,698 | B2 | 9/2003 | Vartti et al. |
| 6,918,010 | B1 * | 7/2005 | Yeager ......................... 711/137 |
| 7,089,368 | B2 * | 8/2006 | Hooker ......................... 711/137 |

(Continued)

OTHER PUBLICATIONS

IBM z/Architecture Principles of Operation, 6th Edition, Apr. 2007, SA22783205, pp. 1-x51.

(Continued)

*Primary Examiner* — Pierre-Michel Bataille
(74) *Attorney, Agent, or Firm* — William A. Kinnaman, Jr.

(57) ABSTRACT

Systems and Program Products are created to execute a prefetch data machine instruction having an M field performs a function on a cache line of data specifying an address of an operand. The operation comprises either prefetching a cache line of data from memory to a cache or reducing the access ownership of store and fetch or fetch only of the cache line in the cache or a combination thereof. The address of the operand is either based on a register value or the program counter value pointing to the prefetch data machine instruction.

18 Claims, 7 Drawing Sheets

(56) References Cited

U.S. PATENT DOCUMENTS

| | | |
|---|---|---|
| 7,111,125 B2 | 9/2006 | Hooker |
| 7,155,588 B1 | 12/2006 | Jeter et al. |
| 7,246,187 B1 | 7/2007 | Ezra et al. |
| 7,966,453 B2 | 6/2011 | Shum et al. |
| 2003/0009629 A1 | 1/2003 | Gruner et al. |
| 2004/0015683 A1 | 1/2004 | Emma et al. |
| 2004/0260877 A1 | 12/2004 | Hooker |
| 2005/0188159 A1 | 8/2005 | Van Doren et al. |
| 2006/0095679 A1 | 5/2006 | Edirisosoriya |
| 2006/0149904 A1 | 7/2006 | Mowry |
| 2006/0155886 A1 | 7/2006 | da Silva et al. |
| 2006/0161740 A1 | 7/2006 | Kottapalli et al. |
| 2009/0157967 A1 | 6/2009 | Greiner et al. |
| 2012/0124292 A1 | 5/2012 | Shum et al. |

OTHER PUBLICATIONS

Hill et al, "Cooperative shared Memory: Software and Hardware for Scalable Multiprocessors", proceedings of Fifth International Conference on Architectural Support for Programming Language and Operation Systems (ASPLOS V), Oct. 1992.

Keleher "Lazy Release Consistency for Distributed Shared Memory", Thesis, Rice University, Jan. 1995.

Anderson "The Performance of Spin Lock Alternatives for Shared-Memory Microprocessors", IEEE Transactions on Parallel and Distributed Systems, V1, N. 1, pp. 6-16, Jan. 1990.

Hu et al JIAJIA: A Software DSM System Based on a New Cache Coherence Protocol, HPCN Europe 1999, pp. 463-472.

U.S. Appl. No. 13/344,636 to Greiner et al., filed Jan. 6, 2012, Notice of Allowance dated Aug. 15, 2012.

U.S. Appl. No. 13/344,636 to Greiner et al., filed Jan. 6, 2012, Office Action dated Sep. 16, 2013.

U.S. Appl. No. 11/954,526 to Greiner et al, filed Dec. 12, 2007, Office Action dated Dec. 10, 2010.

U.S. Appl. No. 11/954,526 to Greiner et al, filed Dec. 12, 2007, Notice of Allowance dated Mar. 18, 2011.

U.S. Appl. No. 11/954,374 to Shum et al., filed Dec. 12, 2007, Office Action dated Sep. 29, 2010.

U.S. Appl. No. 11/954,374 to Shum et al., filed Dec. 12, 2007, Notice of Allowance dated Feb. 18, 2011.

U.S. Appl. No. 13/105,235 to Shum et al., filed May 11, 2011, Office Action dated Jun. 15, 2012.

U.S. Appl. No. 13/105,235 to Shum et al., filed May 11, 2011, Office Action dated Nov. 21, 2012.

U.S. Appl. No. 13/105,235 to Shum et al., filed May 11, 2011, Office Action dated Aug. 19, 2013.

U.S. Appl. No. 13/105,235 to Shum et al., filed May 11, 2011, Office Action dated Dec. 18, 2013.

U.S. Appl. No. 13/344,636 to Greiner et al., filed Jan. 6, 2012, Office Action dated Mar. 14, 2012.

* cited by examiner

PREFETCH DATA

| PFD | | M$_1$,D$_2$(X$_2$,B$_2$) | | | | [RXY] |
|---|---|---|---|---|---|---|
| 'E3' | M$_1$ | X$_2$ | B$_2$ | DL$_2$ | DH$_2$ | '36' |

0        8    12   16   20              32        40      47

PREFETCH DATA RELATIVE LONG

| PFDRL | | M$_1$,I$_2$ | | [RIL] |
|---|---|---|---|---|
| 'C6' | M$_1$ | '2' | I$_2$ | |

CREATING A PROGRAM PRODUCT OR SYSTEM FOR EXECUTING AN INSTRUCTION FOR PRE-FETCHING DATA AND RELEASING CACHE LINES

CROSS-REFERENCE TO RELATED APPLICATIONS

This is a continuation of U.S. patent application Ser. No. 13/344,636 "AN INSTRUCTION FOR PRE-FETCHING DATA AND RELEASING CACHE LINES" filed Jan. 6, 2012, now U.S. Pat. No. 8,683,138, issued Mar. 25, 2014, which is a continuation of U.S. patent application Ser. No. 11/954,526 "AN INSTRUCTION FOR PRE-FETCHING DATA AND RELEASING CACHE LINES" filed Dec. 12, 2007, now U.S. Pat. No. 8,122,195, issued Feb. 21, 2012, both of which applications and patents are incorporated by reference herein.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to computer systems and in particular to systems which allow software pre-fetch data from memory and alter cache state.

DESCRIPTION OF BACKGROUND

In a multiprocessing system where a consistent memory usage model is required, memory usage among different processors is managed using cache coherency ownership schemes. These schemes usually involve various ownership states to a cache line. Preferably, these states include read-only (commonly known as shared or fetch access ownership), and exclusive (where a certain processor has the sole and explicit update rights to the cache line, sometimes known as store access ownership).

For one such protocol used for a strongly-ordered memory consistency model, as in IBM's z/Architecture® implemented by IBM System z processors, when a processor is requesting rights to update a line, e.g. when it is executing a "Store" instruction, it will check its local cache (L1) for the line's ownership state. If the processor finds out that the line is either currently shared or is not in its cache at all, it will then send an "exclusive ownership request" to the storage controller (SC), which serves as a central coherency manager. The IBM® z/Architecture® is described in the z/Architecture Principles of Operation SA22-7832-05 published April, 2007 by IBM and is incorporated by reference herein in its entirety.

U.S. Pat. No. 7,966,453 "METHOD AND APPARATUS FOR ACTIVE SOFTWARE DISOWN OF CACHE LINES EXCLUSIVE RIGHTS" by IBM filed concurrently with the present application is incorporated by reference herein in its entirety.

U.S. Pat. No. 5,623,632 "System and method for improving multilevel cache performance in a multiprocessing system" from IBM, filed May 15, 1995, incorporated herein by reference, describes a multiprocessor system having a plurality of bus devices coupled to a storage device via a bus, wherein the plurality of bus devices have a snoop capability, and wherein the plurality of bus devices have first and second caches, and wherein the plurality of bus devices utilize a modified MESI data coherency protocol. The system provides for reading of a data portion from the storage device into one of the plurality of bus devices, wherein the first cache associated with the one of the plurality of bus devices associates a special exclusive state with the data portion, and wherein the second cache associated with the one of the plurality of bus devices associates an exclusive state with the data portion. A bus device initiating, a write-back operation with respect to the data portion, determining if there are any pending snoops in the second cache, and changing the special exclusive state to a modified state if there are no pending snoops in the second cache. If there is a pending snoop in the second cache, a comparing of addresses of the pending snoop and the data portion is performed. The special exclusive state is changed to a modified state if the addresses are different. The special exclusive state indicates that a data portion is held in the primary cache in a shared state and that the data portion is held in the secondary in an exclusive state.

In one embodiment, a storage controller (SC) tracks which processor, if any, currently owns a line exclusively. If deemed necessary, the storage controller (SC) will then send a "cross interrogate" (XI) or "ownership change" request to another processor which currently owns that line to release its exclusive rights. In this embodiment, a cross interrogate (XI) is referred to as "cross invalidate" since the action may invalidate the line in the other processor cache. Once the current owning processor has responded to the XI and responded that the exclusive ownership is released, the requesting processor will then be given exclusive update rights to the line requested.

In a large SMP (Symmetric Multi-Processing) system, it is common that various processes running on different processors update the same cache lines, but at different times. When a line is updated by one process, and then another process starts up, updating the same line by the one process will encounter delays required for XI acknowledgement while exchanging exclusive ownerships from one processor to another. These delays amount to a significant performance degradation as number of processes goes up that reuse the same cache lines.

A program application would, of course, know whether a particular data object (cache line) it had stored to would be needed again in the near future by the program. Such a program may desire to release the cache line associated with the store in order to improve performance in a multi-processor environment, however prior to the present invention, this was not possible.

SUMMARY OF THE INVENTION

The shortcomings of the prior art are overcome and additional advantages are provided through the provision of a new instruction or instruction variation that allows software to indicate to hardware that its storage modification to a particular cache line is done, and that it will not be doing any further modification for the time being.

This invention provides prefetch data machine instructions to prefetch data to the cache from memory and/or to signal the CPU hardware that the program is done with a particular cache line, and will not be doing any further modification for a long time, allowing the system to alter its cache state according to information provided by executing the instruction. With this indication, the processor can then actively release its exclusive ownership by updating its line ownership from exclusive to read-only (or shared) in its own cache directory and in the storage controller (SC). By actively giving up its exclusive rights, the first processor allows a subsequent request from another processor to immediately be given exclusive ownership to that cache line without waiting on any processor's explicit cross invalidate acknowledgement. This invention is supported by the described hardware design needed to provide this support.

After receiving such indication, a microprocessor can actively relinquish its exclusive ownership to a cache line, and preemptively update the ownership status in the storage controller to "shared", thus removing delays due to XIs that would have otherwise been encountered should another processor request an exclusive ownership to the cache line.

The actual microprocessor implementation involves processing the instruction, and new interface to communicate the "demote" request to the storage controller. It is also important to provide necessary interlock to prevent a premature launch of the "demote" request. For use in a microprocessor design with a private L2, a design is described to ensure all prior committed storage updates are sent and are received in the storage controller before the "demote" request is sent.

It is therefore an feature of the invention to provide a method, system and program product for executing a prefetch data machine instruction for a processor having a cache wherein the processor fetches the prefetch data machine instruction in a program, the data prefetch machine instruction comprising an opcode field, wherein the cache caches cache lines of memory information. The processor executing the fetched data prefetch machine instruction, the execution comprising determining, an address of an operand in memory; and performing a determined cache action on a cache line, the cache line associated with the determined address of the operand in memory, the cache action consisting of responsive to the determined cache action being an access ownership action, changing access ownership of a line of data in the cache, the access ownership comprising any one of store access ownership, fetch access ownership, modified access ownership, owned access ownership, exclusive access ownership, shared access ownership or invalid access ownership.

It is a further feature of the invention to execute the instruction wherein said cache line is resident in a cache of a processor executing the instruction, said cache action consisting of any one of reducing the access ownership from store access ownership to fetch access ownership, or reducing the access ownership from fetch access ownership to no access ownership.

It is another aspect of the invention to execute the instruction wherein the data prefetch machine instruction further comprises an M field and second operand information, wherein the function of the data prefetch machine instruction further comprises: interpreting the M field to determine the cache action to be performed; determining from said second operand information, the address of the operand in memory; and wherein the cache action further consisting of: responsive to the determined cache action being a prefetch action, prefetching said operand in memory into a line of a cache, the cache associated with a processor executing the instruction.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution which reduces the overhead of cache line sharing by multiple processes across a large SMP system that contains writeable data. The overall system wide performance can then be improved.

BRIEF DESCRIPTION OF THE DRAWINGS

The subject matter which is regarded as the invention is particularly pointed out and distinctly claimed in the accompanying claims. The foregoing and other objects, features, and advantages of the invention are apparent from the following detailed description taken in conjunction with the accompanying drawings in which:

FIG. 9 illustrates an example format of Prefetch Data instructions; and

The detailed description herein explains preferred embodiments of the invention, together with advantages and features, by way of example with reference to the drawings.

DETAILED DESCRIPTION

To allow software to indicate to hardware that a line is no longer required for further storage update, an instruction can be provided, with a way to indicate the logical address, as suited to a specific architecture. This is done with a new opcode or a new variation of an existing cache management instruction using unused fields or code-points. This specific instruction is likely expected to be used in device drivers, operating system code or any application that uses common parameter blocks or semaphore blocks.

The intention of this provision is that the software code will treat this as a "done with store to this line" instruction, herein simply called a "demote" instruction (which may be embodied in a "PREFETCH DATA" instruction described herein). Preferably, the instruction is used for lines that contain highly utilized data across various processes that are executing in different processors and most likely at different times.

One typical software example comprises the management of a cache line that contains various semaphore locks needed for multiprocessor handling. The effect of the software using this provision will be to obtain or release a software lock managed in a cache line, and then demote the line actively. By releasing the line actively, other processes can proceed quicker to either obtain or release the same lock or other locks managed within the same cache line in their respective caches.

An important thing is that the software application knows that this is the last point of update until some period of time later. If the software requires an update to the line soon after a "demote", it would instead be bad for performance, since then the processor will take time to regain the exclusive rights.

Figure 1:
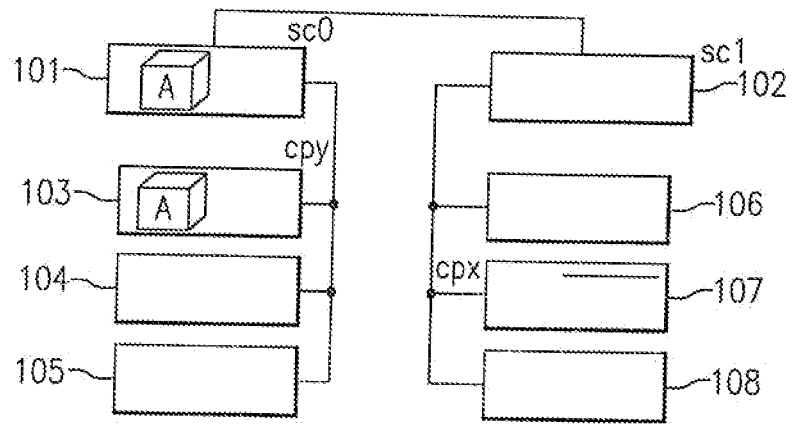
FIG. 1 illustrates an initial state X where processor CPy owns line A exclusive.

One example embodiment is implemented in a computer system with a cache hierarchy as illustrated in FIG. 1. FIG. 1, like subsequent FIGS. 2-5, illustrates a bi-nodal system where the Storage Controller (SC) is made up of 2 different physical node controllers SC0 101 and SC1 102, each having 3 processors 103-108 attached.

Figure 2:
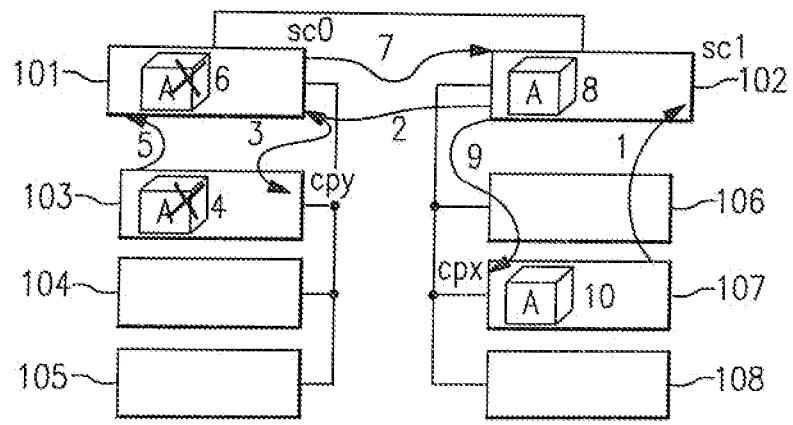
FIG. 2 illustrates what happens when processor CPx needs line A exclusive after an initial state X.

FIG. 1 indicates a typical initial state where processor 103 (CPy) already owns the exclusive rights to a cache line A. FIG. 2 illustrates that when processor 107 (CPx) requests to have exclusive rights to the same cache line A, (e.g. when it is executing a "Store" instruction and needs store access, for example) while processing a storage update instruction, the wait on getting a confirmation on the cross interrogate (XI) from the current owning processor 103 (CPy) delays this requesting processor 107 (CPx) from being able to start any storage update to the line A.

With the provision of a "demote" instruction, instead of having to take up the delay on the XI acknowledgement, the SC 101 or 102 would have already updated its directory to show that no processor currently owns the line exclusively, and thus can return the line A exclusively to processor 107 CPx when processor 107 CPx requests for it in a very timely manner. This is shown in FIGS. 3 and 4.

Figure 3:
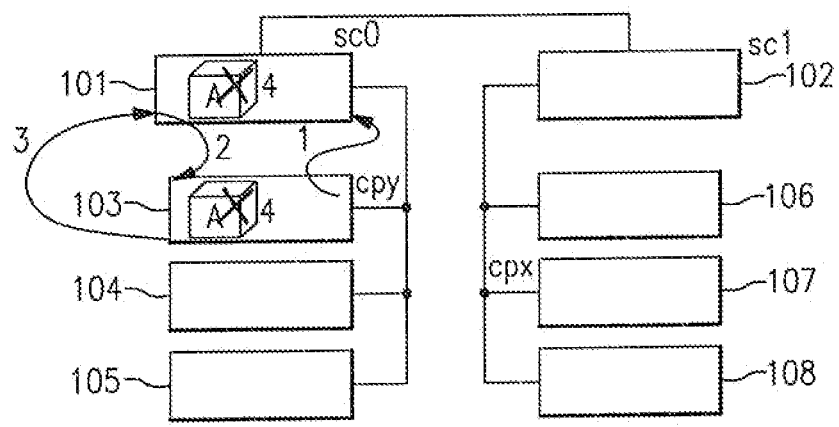
FIG. 3 illustrates CPy executes a demote to line A after an initial state X.

In FIG. 3, when the application running in processor 103 CPy decides to "demote" the cache line, processor 103 CPy will send a demote request on line A to SC0 101. Once the demote request is received, the SC0 101 will process the request as if a processor is requesting line A exclusive (even though no processor is actually requesting this). It will start up the lookup in its directory, send a cross interrogate to processor 103 CPy to request a release on exclusive rights. Processor 103 CPy at this time should naturally be accepting the release request. Processor 103 CPy will update its directory with no more exclusive rights and send back an acknowledgement to SC0 101. Once the acknowledgement is received, the SC0 101 will update its directory update to indicate that line A is now exclusive to "no one". The software demote process is thus accomplished.

Figure 4:
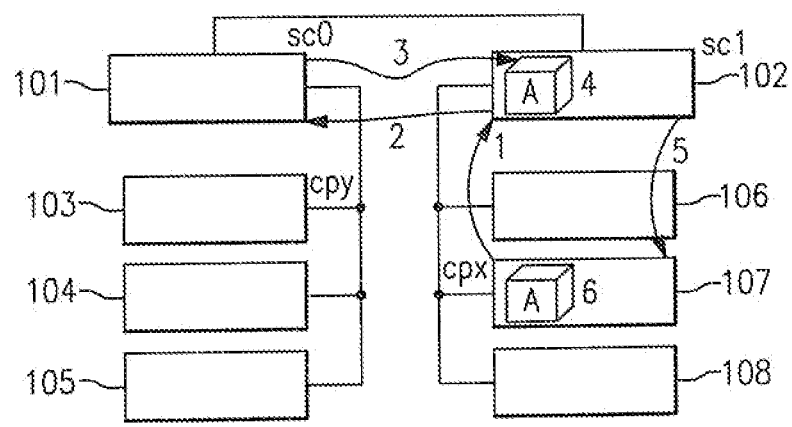
FIG. 4 illustrates what happens when processor CPx needs line A exclusive after the demote process.

Now, as seen in FIG. 4, if another processor 107 CPx requests line A exclusive, the SC1 102 can quickly request the line exclusively from SC0 101, and then reply to the requesting processor 107 CPx with an exclusive response without acquiring any delay for cross interrogation towards processor 103 CPy. This reduction of delay could be even more apparent in a system if the Storage Controllers 101, 102 are on a different chip(s) than the processors, where the cross-chip communication is now removed.

Figure 5:
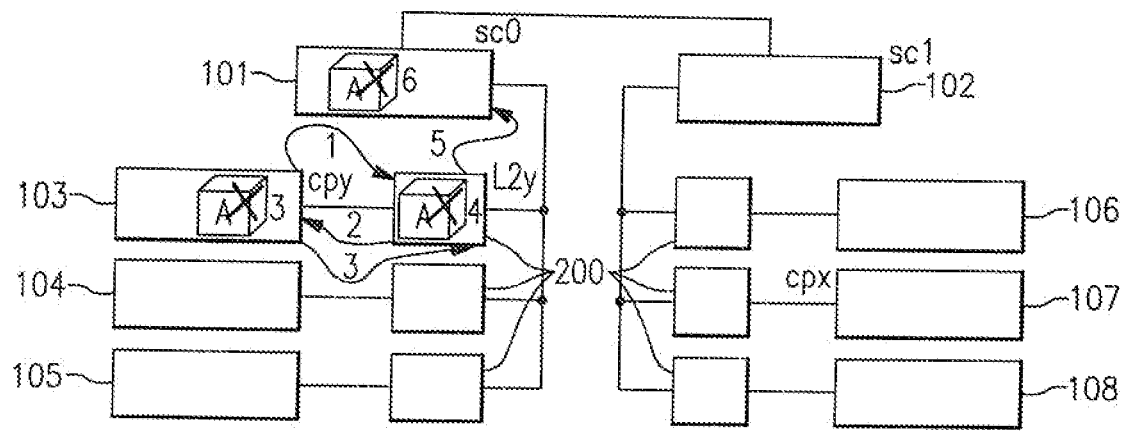
FIG. 5 illustrates a demote process for a different system design having private L2 cache.

To further describe a variant implementation of this demote instruction, we will illustrate with a system where there is a private Level 2 cache (L2) per processor. This is shown in FIG. 5. Each processor 103-108 in this system has a private L2 200.

In this design, when processor 103 CPy sends a demote request to its private L2 200 L2y, the L2 will lookup its directory, and then send a release exclusive cross interrogate back into the processor 103 CPy. The Load Store Unit (LSU) inside the processor 103 CPy will process the interrogate request, remove its directory status of exclusive ownership, and acknowledge to L2 200 L2y that this is done.

This private L2 200 L2y will then also update its directory to indicate no exclusive ownership, and send a demote request to the SC0 101. Upon receiving the demote request, SC0 101 will update its directory to indicate the line A is now exclusive to "no one". With this illustration, it will be appreciated that this function can be implemented with various systems having a different cache hierarchy or topology than that illustrated. Because these can be implemented by those skilled in the art after learning of this teaching, all there variants are not specifically shown.

A computer instruction executing on a processor practicing the present invention might employ any of a variety of cache line state mechanisms advantageously including the well known MESI and MOESI snoop mechanisms.

According to the online Wikipedia, the free encyclopedia, Modified Exclusive, Shared Invalidate (MESI) is as follows:

MESI: A cache may satisfy a read from any state except Invalid. An Invalid line must be fetched (to the Shared or Exclusive states) to satisfy a read.

A write may only be performed if the cache line is in the Modified or Exclusive state. If it is in the Shared state, all other cached copies must be invalidated first. This is typically done by a broadcast operation known as Read For Ownership (RFO).

A cache may discard a non-Modified line at any time, changing to the Invalid state. A Modified line must be written back first.

A cache that holds a line in the Modified state must (intercept) all attempted reads (from all of the other CPUs in the system) of the corresponding main memory location and insert the data that it holds into memory. This is typically done by forcing the read to back off (i.e. to abort the memory bus transaction), then writing the data to main memory and changing the cache line to the Shared state.

A cache that holds a line in the Shared state must also snoop all invalidate broadcasts from other CPUs, and discard the line (by moving it into Invalid state) on a match.

A cache that holds a line in the Exclusive state must also snoop all read transactions from all other CPUs, and move the line to Shared state on a match.

The Modified and Exclusive states are always precise: i.e. they match the true cacheline ownership situation in the system. The Shared state may be imprecise: if another CPU discards a Shared line, and this CPU becomes the sole owner of that cacheline, the line will not be promoted to Exclusive state (because broadcasting all cacheline replacements from all CPUs is not practical over a broadcast snoop bus).

In that sense the Exclusive state is an opportunistic optimization: If the CPU wants to modify a cache line that is in state S, a bus transaction is necessary to invalidate all other cached copies. State E enables modifying a cache line with no bus transaction.

Read For Ownership:

A Read For Ownership (RFO) is an operation in CACHE COHERENCY protocols. The operation is issued by a processor trying to write into a cache line that is not exclusive to itself, i.e., that is in the shared (S) or invalid (I) states of the MESI protocol. The operation causes all other processors to set the state of such line to I.

Also, according to the online Wikipedia, the free encyclopedia, Modified, Owned Exclusive, Shared Invalidate (MOESI) is as follows:

From Wikipedia, the free encyclopedia MOESI is a full CACHE COHERENCY protocol that encompasses all of the possible states commonly used in other protocols. As discussed in AMD64 Architecture Programmer's Manual Vol 2 'System Programming', each CACHE LINE is in one of five states:

Modified: A cache line in the modified state holds the most recent, correct copy of the data. The copy in main memory is stale (incorrect), and no other processor holds a copy.

Owned: A cache line in the owned state holds the most recent, correct copy of the data. The owned state is similar to the shared state in that other processors can hold a copy of the most recent, correct data. Unlike the shared state, however, the copy in main memory can be stale (incorrect). Only one processor can hold the data in the owned state—all other processors must hold the data in the shared state.

Exclusive: A cache line in the exclusive state holds the most recent, correct copy of the data. The copy in main memory is also the most recent, correct copy of the data. No other processor holds a copy of the data.

Shared: A cache line in the shared state holds the most recent, correct copy of the data. Other processors in the system may hold copies of the data in the shared state, as well. The copy in main memory is also the most recent, correct copy of the data, if no other processor holds it in owned state.

Invalid: A cache line in the invalid state does not hold a valid copy of the data. Valid copies of the data can be either in main memory or another processor cache.

This protocol, a more elaborate version of the simpler MESI protocol, avoids the need to write modifications back to main memory when another processor tries to read it. Instead, the Owned state allows a processor to retain the right to modify a shared cache line by promising to share any writes it performs with the other caches.

MOESI is beneficial when the communication latency and bandwidth between two CPUs is significantly better than to main memory. Multi-core CPUs with per-core L2 caches are an example of that.

Figure 6:
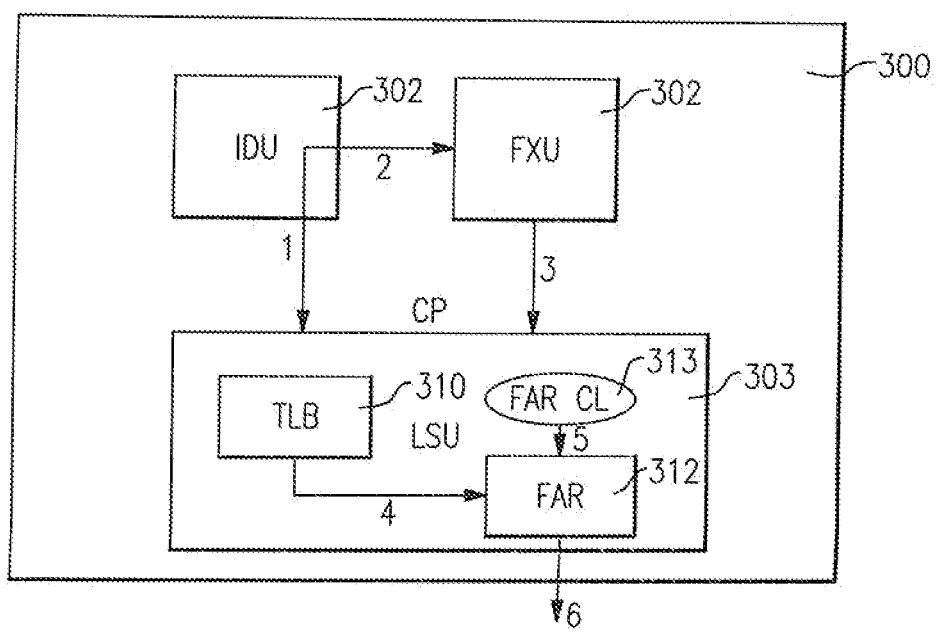
FIG. 6 illustrates a typical processor that is executing the demote instruction

FIG. 6 illustrates how such an instruction is processed within a microprocessor core. For this description, only 3 of the key units IDU 301 (Instruction Dispatch Unit), FXU 302 (Fixed Point Unit), and LSU 303 (Load Store Unit) are depicted as part of the microprocessor CP 300.

During hardware execution of this instruction, the microprocessor pipeline will execute this instruction as a 1 cycle superscalar instruction that performs no architectural updates. All the work is to be performed by the cache subsystem.

For an in-order microprocessor CP 300, when the "demote instruction" is dispatched from the instruction dispatch unit IDU 301, the logical address calculated according to the instruction format and a decode of such instruction indicating a demote operation will be sent from IDU 301 to LSU 303 (arrow 1). In parallel, IDU 301 will send the opcode to FXU 302 (arrow 2) which will complete the instruction if this is the next to complete without waiting for any acknowledgement or doing any architectural update.

LSU 303 will obtain the absolute address used in cache management by either looking up the address translation of the logical address sent from IDU 301 in its TLB 310, or obtain a translation result through a dynamic translation process. Once the absolute address is obtained (arrow 4), it will arm the absolute address and a demote command in one of its available Fetch Address Register (FAR) 312. The demote command will be a predefined interface value on the request bus (arrow 6) to the Storage Controller (SC) indicating a "demote" is to be performed.

The LSU's 303 control logic 313 will hold on to the demote request, and wait until all prior instructions complete before it send the demote request and address to the SC (arrow 6). This is done by monitoring pipeline flushing interface from the FXU 302 which controls instruction completion in this example. It is important that the demote request is not sent under an incorrectly predicted branch path, or if any older instruction does not successfully complete due to processor pipeline flushing conditions. Otherwise, unnecessary performance penalty may be incurred.

In an out of order microprocessor, due to the nature of the design, the actual launch of the demote request from the LSU makes use of a tag. To fit into an out of order design, the demote request sitting in the FAR register is tagged with an instruction ID, and only launched when the global completion logic determines that this instruction ID is being completed.

An alternative design, not specifically shown in FIG. 5 but illustrated thereby, will have the demote request be written into a store queue entry (instead of a FAR register entry) at 312. By doing so, since stores have to be completed and processed in order for machines requiring a strongly-ordered memory model, the store queue logic at 312 can precisely send the demote request (through the FAR logic) without being premature.

In a mainframe, architected machine instructions are used by programmers (typically writing applications in "C" but also Java®, COBOL, PL/I, PL/X, Fortran and other high level languages), often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®, Linux can be used as well as machines which use emulation by Hercules, UMX, FSI (Fundamental Software, Inc) or Platform Solutions, Inc. (PSI), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor architecture including, but not limited to control registers, general purpose registers (often including floating point registers), dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

Figure 7:
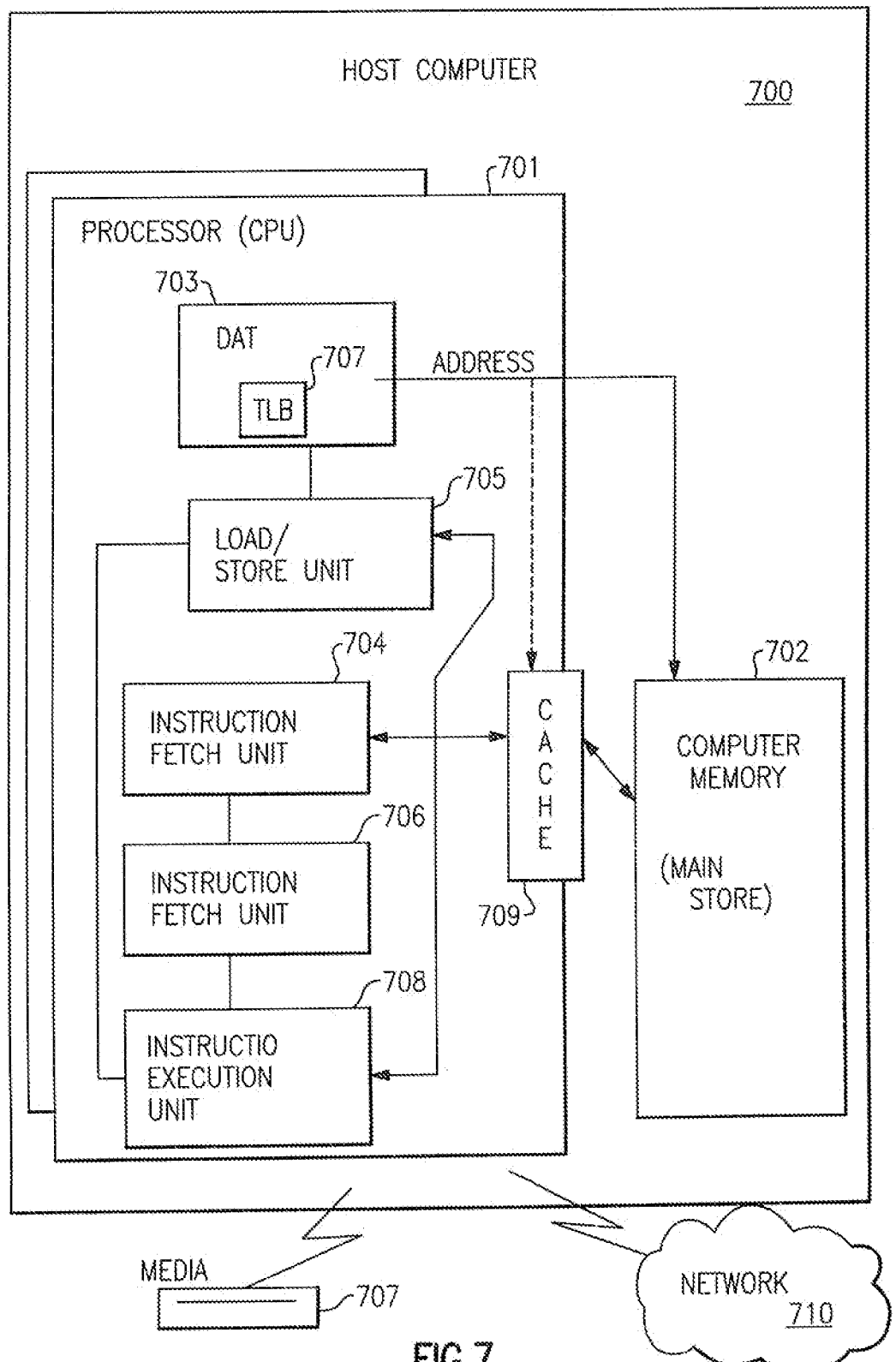
FIG. 7 depicts a Host computer system of the prior art.

Referring to FIG. 7, representative components of a Host Computer system 700 are portrayed. Other arrangements of components may also be employed in a computer system which are well known in the art. The representative Host Computer 700 comprises one or more CPUs 701 in communication with main store (Computer Memory 702) as well as I/O interfaces to storage devices 707 and networks 701 for communicating with other computers or SANs and the like. The CPU may have Dynamic Address Translation (DAT) 703 for transforming program addresses (virtual addresses) into real address of memory. A DAT typically includes a Translation Lookaside Buffer (TLB) 707 for caching translations so that later access to the block of computer memory 702 do not require the delay of address translation. Typically a cache 709 is employed between Computer Memory 702 and the Processor 701. the cache 709 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 702 by an instruction fetch unit 704 via a cache 709. The instruction is decoded in an instruction decode unit (706) and dispatched (with other instructions in some embodiments) to instruction execution units 708. Typically several execution units 708 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 702, a load store unit 705 typically handles the access under control of the instruction being executed.

Software programming code which embodies the present invention is typically accessed by the processor also known as a CPU (Central Processing Unit) 701 of the system 700 from long-term storage media 707, such as a CD-ROM drive, tape drive or hard drive. The software programming code may be embodied on any of a variety of known media for use with a data processing system, such as a diskette, hard drive, or CD-ROM. The code may be distributed on such media, or may be distributed to users from the computer memory 702 or storage of one computer system over a network 710 to other computer systems for use by users of such other systems.

Alternatively, the programming code may be embodied in the memory 702, and accessed by the processor 701 using the processor bus. Such programming code includes an operating system which controls the function and interaction of the various computer components and one or more application programs. Program code is normally paged from dense storage media 707 to high-speed memory 702 where it is available for processing by the processor 701. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 8:
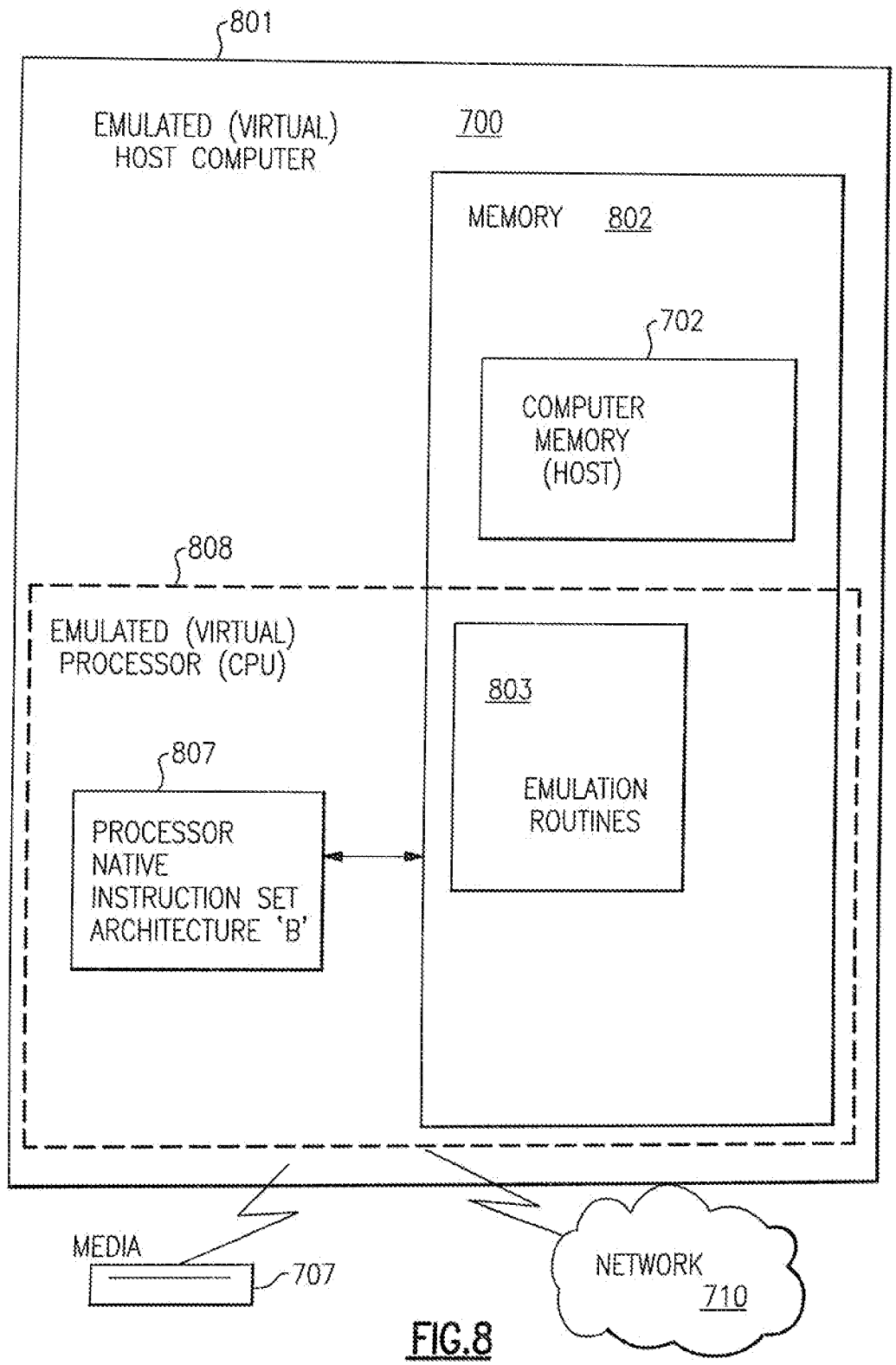
FIG. 8 depicts an emulated Host computer system of the prior art.

In FIG. 8, an example emulated Host Computer system 801 is provided that emulates a Host computer system 700 of a Host architecture. In the emulated Host Computer system 801, the host processor (CPUs) 808 is an emulated Host processor (or virtual Host processor) and comprises an emulation processor 807 having a different native instruction set architecture than that of used by the processor 701 of the Host Computer 700. The emulated Host Computer system 801 has memory 802 accessible to the emulation processor 807. In the example embodiment, the Memory 807 is partitioned into a Host Computer Memory 702 portion and an Emulation Routines 803 portion. The Host Computer Memory 702 is available to programs of the emulated Host Computer 801 according to Host Computer Architecture. The emulation Processor 807 executes native instructions of an architected instruction set of an architecture other than that of the emulated processor 808, the native instructions obtained from Emulation Routines memory 803, and may access a host instruction for execution from a program in Host Computer Memory 702 by employing one or more instruction(s) obtained in a Sequence & Access/Decode routine which may decode the host instruction(s) accessed to determine a native instruction execution routine for emulating the function of the host instruction accessed. Other facilities that are defined for the Host Computer System 700 architecture may be emulated by Architected Facilities Routines, including such facilities as General Purpose Registers, Control Registers, Dynamic Address Translation and I/O Subsystem support and processor cache for example. The Emulation Routines may also take advantage of function available in the emulation Processor 807 (such as general registers and dynamic translation of virtual addresses) to improve performance of the Emulation Routines. Special Hardware and Off-Load Engines may also be provided to assist the processor 807 in emulating the function of the Host Computer 700.

Figure 10:
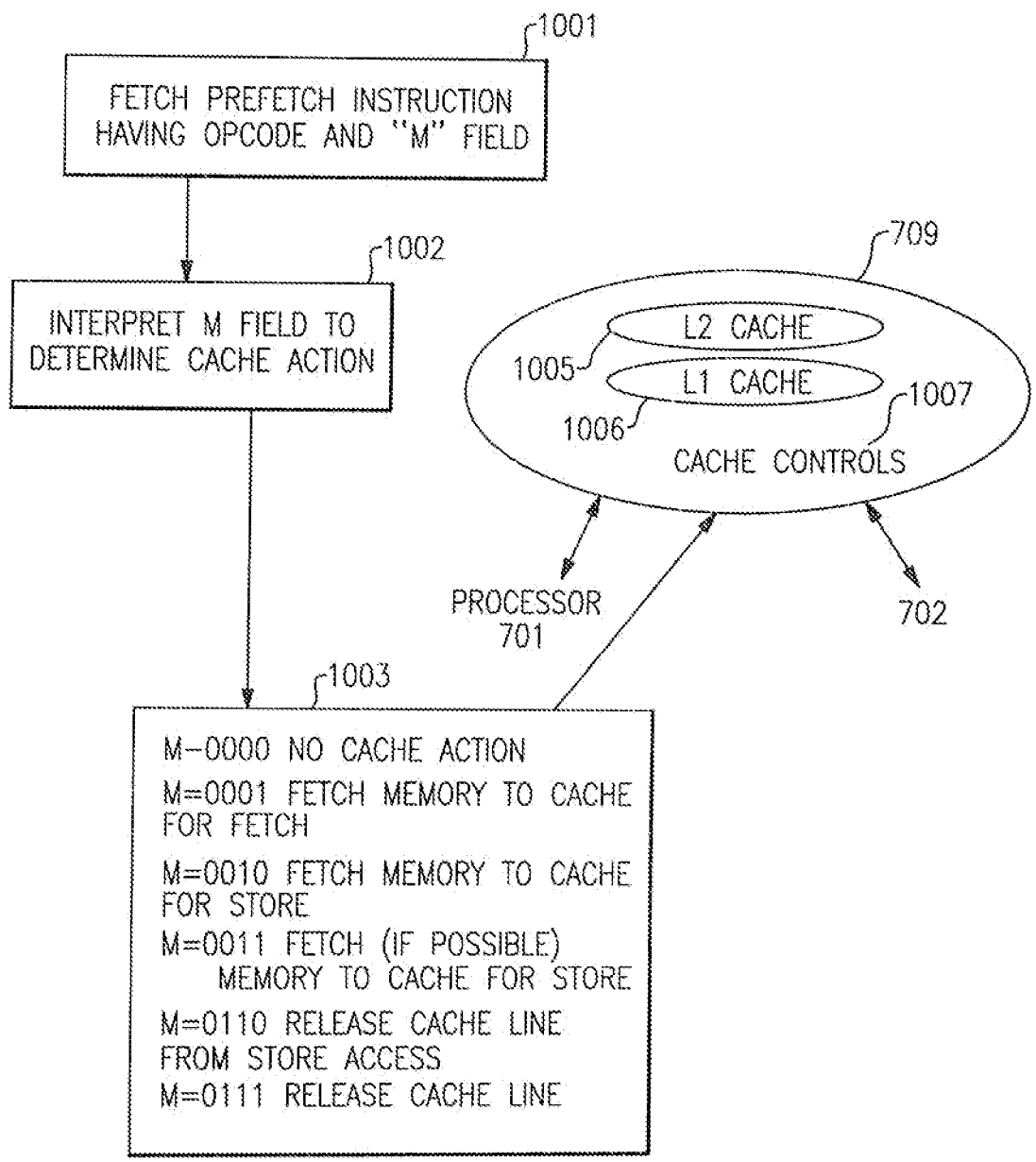
FIG. 10 illustrates an example flow depicting the function of the invention.

The present invention provides prefetch data instructions for prefetching a line of data to cache and for modifying the ownership level of a line of data in the cache. When a PREFETCH DATA instruction FIG. 9 (comprising any of a PREFETCH DATA instruction and a PREFETCH DATA RELATIVE LONG instruction) is fetched FIG. 10 1001 and executed by a processor 701 or CPU (Central Processing Unit), subject to the controls specified in the M field of the instruction, the CPU 701 interprets 1002 the M field to determine what function 1003 is to be performed by the PREFETCH DATA instruction. Either the CPU function is to prefetch the second operand from memory 702 into a cache line of a cache 1005 1006, or it is to release a cache line containing the second operand. The second operand designates a logical address which is the address to memory that the program uses, a logical address (sometimes called a virtual address) that is subject to Dynamic Address Translation (DAT) in some embodiments.

Preferably the cache 709 comprises only a single L1 cache 1006 or both a L1 cache 1006 and a higher level L2 Cache. Cache controls 1007 responsible for manipulating the cache data also manipulate cache coherency protocols (XI, MESI or MEOSI) in order to perform the pre-fetch of the cache line into a cache (and evict a previous line to make room for the prefetched line) and to manage the cache ownership protocol (cache coherency) with caches of other processors sharing a memory subsystem.

The cache controls 1007 will ascertain first whether the line is already in one of the caches and will prefetch the line into one of the caches from memory if needed. The cache controls 1007 will also manipulate the cache ownership according to the function 1003 identified by the M field 1002. A cache ownership of Store indicates to the processor that store is permitted to the cache line as by the processor so the processor "owns" the cache line to be able to store into it. A cache ownership of fetch indicates the processor is permitted to fetch from the cache line but not to store (modify) it. A cache ownership of release in one embodiment indicates that the cache may invalidate the line (evict it).

In an embodiment, a PREFETCH DATA (PFD) instruction comprises an opcode "E3" in bits 0-7, an M1 field in bits 8-11, an X2 field in bits 12-15, a B2 field in bits 16-19, a displacement field low order DL2 in bits 20-31, a displacement field high order DH2 in bits 32-39 and an opcode extension "36" in bits 40-47. In order to generate a logical address of a second operand in memory, the signed displacement represented by DH||DL (sign extended for 2's complement) is algebraically added to a value in a register designated by the B2 field. If the X2 field is not zero, the value in the register designated by the X2 field is added as well.

In an embodiment, a PREFETCH DATA RELATIVE LONG (PFDRL) instruction comprises an opcode "C6" in bits 0-7, an M1 field in bits 8-11, an extended opcode in bits 12-15 and an immediate field I2 in bits 16-47. The address of the second operand is obtained by algebraically adding the signed I2 field (sign extended for 2's complement) to the program counter value (the program counter value is preferably pointing to the PFDRL being executed.

The M1 field contains a 4-bit unsigned binary integer that is used as a code to signal the CPU as to the intended use of the second operand. The codes are as follows:

| Code | Function Performed |
|---|---|
| 1 | Prefetch the line of data at the second-operand address to the CPU cache for fetch access ownership. |
| 2 | Prefetch the line of data at the second-operand address to the CPU cache for store access ownership. |
| 3 | Conditionally prefetch the line of data at the second operand to the CPU cache for possible store access. The CPU will attempt to prefetch the cache line to have store access ownership to it, but if the line is not available for store access ownership, the CPU can prefetch the line for fetch access ownership. |
| 6 | Release the cache line in the CPU cache from store access ownership. The cache line containing the second operand; retain the data in the cache line for fetch access ownership |
| 7 | Release the cache line in the CPU cache from all access ownership. The cache line containing the second operand |

Other codes are possible including those supporting MESI and MOESI coherency caches. For example, codes might be employed to release a cache line from any of the MOESI or MESI states explicitly or according to a priority scheme for example. In an embodiment, certain MESI or MOESI ownership states may only be accessed when executing a privileged version of an instruction or when executing in a privileged (supervisor) mode.

Depending on the implementation, the CPU may not implement all of the prefetch functions. Preferably, for functions that are not implemented by the CPU, and for reserved functions, the instruction acts as a no-op. Code 0 preferably always acts as a no-op.

Preferably, no access exceptions or Program Event Recording (PER) storage-alteration exceptions are recognized for the second operand. In one embodiment, for codes 2 and 3, it is unpredictable whether the change bit is set for the second operand. The change bit is a bit associated with a page of storage that indicates whether the page has been modified, in which case it must be returned to non-volatile store (DASD) when being "paged out" of memory (storage). For all codes, a TLB entry may be formed for the data that is prefetched. For PREFETCH DATA, the displacement field of the instruction is treated as a 20-bit signed For the PREFETCH DATA RELATIVE LONG instruction, the contents of the I2 field are signed binary integer specifying the number of halfwords that is to be added to the address of the instruction (program counter address) to generate the address of the second operand. When the CPU is in certain modes, for example, the z/Architecture primary-space, secondary-space or access-register modes, the second operand is assumed to be in a predetermined mode (the z/Architecture primary address space for example). When the CPU is in the z/Architecture home-space mode, the second operand is assumed to be in the z/Architecture home address space.

An Operation exception may be encountered if the instruction facility supporting the instruction (the z/Architecture general-instructions-extension facility) is not installed. An Operation exception would cause a context switch, passing the CPU to a program for handling Operation exceptions.

A Prefetch DATA instruction or a PREFETCH DATA (RELATIVE LONG) instruction, when executed, preferably signals the CPU to perform the specified operation, but it does not guarantee that the CPU will necessarily honor the request. In an embodiment, there is no guarantee that storage location will still be in the cache when a subsequent instruction references the location. Likewise, in the embodiment, there is no guarantee that when a cache line is released that the CPU will not subsequently refetch it (independent of any prefetching operations). Rather, the PREFETCH DATA (RELATIVE LONG) instruction simply provides hints as to the program's anticipated use of storage areas for such embodiments. If an exception condition would otherwise be recognized when accessing the second operand, PREFETCH DATA (RELATIVE LONG) is preferably completed with no indication of the exception provided to the program, however, the performance of the PREFETCH DATA (RELATIVE LONG) instruction may be significantly slower than if the exception condition did not exist. In an embodiment, significant delay may be experienced if a storage location has been prefetched and then released, and then a subsequent instruction references the same storage location. Similarly, a delay may be experienced if a storage location has been prefetched for fetch access ownership, and then a subsequent instruction references the same location for storing. In CPUs that implement separate data and instruction caches, the use of codes 2 or 3 to prefetch (for storing) a cache line from which instructions will subsequently be fetched may cause significant delays in some embodiments. Similar delays may be experienced for any store operation into a cache line from which instructions are subsequently fetched. The use of PREFETCH DATA (RELATIVE LONG) instructions to prefetch operands that are frequently updated in a multiprocessing environment may actually degrade performance by causing unnecessary contention for the cache line. A prefetch operation preferably consists of fetching a cache line on an integral boundary. The cache line size (and corresponding integral boundary) may be determined by executing an EXTRACT CACHE ATTRIBUTE instruction for example. The second operand is preferably fetched into the cache line in predetermined units that may differ between models of CPUs, on an integral boundary, the minimum size of which is preferably a doubleword. Thus, preferably at least the rightmost three bits of the second-operand address are assumed to contain zeros, regardless of what is specified by the program. Preferably, the unit directly addressed by the second-operand address is prefetched first. The order in which the remaining units of the cache line are prefetched is also implementation dependent.

As illustrated, the present invention can help improve system performance by carefully inserting "demote" instructions in software code, with a hardware provision of such mechanism. It requires thoughtful implementation in software, firmware, together with hardware to be effective.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for creating a computer program product for executing a prefetch data machine instruction, the method comprising:
    obtaining instructions, by a processor, for executing the prefetch data machine instruction; and
    storing the obtained instructions, by a processor, on a computer program product storage medium readable by a processing circuit, the stored instructions configured to cause the processing circuit to perform a method comprising:
        executing, by the processor, the prefetch data machine instruction, the prefetch data machine instruction configured to either prefetch data to the cache or change access ownership of a cache line in the cache, the executing comprising:
        determining whether to perform a data prefetch cache action or a cache line ownership operation, the data prefetch cache action for prefetching a cache line of data from memory to the cache, the cache line ownership operation for changing cache access ownership of a line of data in the cache;
        determining an address of an operand in memory; and
        based on determining to perform the cache line ownership operation, performing a determined cache action on a cache line in the cache, the cache line associated with the determined address of the operand, the cache action comprising:
        based on the determined cache action being a release store access ownership action, changing access ownership of the cache line to a fetch access ownership, the store access ownership indicating that the processor intends to store to the cache line, the fetch access ownership indicating that the processor intends to fetch data from the cache line; and
        based on the determined cache action being a release fetch access ownership action, releasing access ownership, the released access ownership indicating that the processor does not intend to access to the cache line.

2. The method according to claim 1, wherein the store access ownership indicates the cache line is not available to other processors, and wherein the fetch access ownership indicates the cache line may be shared by other processors.

3. The method according to claim 2, wherein the prefetch data machine instruction further comprises an option field and operand information, wherein the function of the prefetch data machine instruction further comprises:
    interpreting the option field to determine whether to perform the data prefetch cache action or the cache line ownership operation;
    determining from said operand information, the address of the operand; and
    based on the determined cache action being a data prefetch action, prefetching said operand into said cache line of said cache.

4. The method according to claim 3, wherein the cache action comprises:
    based on the option field being a first value, performing no cache action;
    based on the option field being a second value, prefetching to the cache, data specified by the operand address for fetch access ownership wherein the cache line access ownership is set as fetch access ownership; and
    based on the option field being a third value, prefetching to the cache, data specified by the operand address for store access ownership wherein the cache line access ownership is set as store access ownership.

5. The method according to claim 3, wherein the cache action comprises:
    based on the option field being a fourth value and store access ownership being available, prefetching to the cache, data specified by the operand address for store access ownership wherein the cache line access ownership is set as store access ownership; and
    based on the option field being the fourth value and store access ownership being not-available, prefetching to the cache, data specified by the operand address for store access ownership wherein the cache line access ownership is set as fetch access ownership.

6. The method according to claim 1, the executing further comprising:
    based on the determined cache action being a modified access ownership action, changing access ownership of the cache line to indicate the cache line has been modified; and
    based on the determined cache action being an owned access ownership action, changing access ownership of the cache line to indicate the cache line is owned.

7. The method according to claim 1, wherein the prefetch data machine instruction further comprises a signed immediate field, wherein the address of the operand in memory is related to a memory address of the prefetch instruction being executed, comprising adding a halfword aligned sign extended value of the signed immediate field of the instruction to a program address of the prefetch data instruction being executed to determine the address of the operand in memory.

8. The method according to claim 1, wherein access ownership is MOESI protocol, wherein said cache line is resident in a cache of a processor executing the instruction, said cache action comprising any one of:
- changing cache ownership from modified to any one of owned, exclusive, shared or invalid,
- changing cache ownership from owned to any one of modified, exclusive, shared or invalid,
- changing cache ownership from exclusive to any one of modified, owned, shared or invalid, or
- changing cache ownership from shared to any one of modified, owned, exclusive or invalid.

9. The method according to claim 1, further comprising interpreting the prefetch data machine instruction to identify a predetermined software routine for emulating operation of the prefetch data machine instruction; and
wherein the executing the prefetch data machine instruction comprises executing the predetermined software routine to execute the prefetch data machine instruction.

10. A method for creating a computer system for executing a prefetch data machine instruction, the method comprising:
- obtaining configuration information, by a processor, for executing the prefetch data machine instruction; and
- based on the obtained configuration information, configuring the computer system to perform a method comprising:
  - executing, by the processor, the prefetch data machine instruction, the prefetch data machine instruction configured to either prefetch data to the cache or change access ownership of a cache line in the cache, the executing comprising:
    - determining whether to perform a data prefetch cache action or a cache line ownership operation, the data prefetch cache action for prefetching a cache line of data from memory to the cache, the cache line ownership operation for changing cache access ownership of a line of data in the cache:
    - determining an address of an operand in memory; and
    - based on determining to perform the cache line ownership operation, performing a determined cache action on a cache line in the cache, the cache line associated with the determined address of the operand, the cache action comprising:
      - based on the determined cache action being a release store access ownership action, changing access ownership of the cache line to a fetch access ownership, the store access ownership indicating that the processor intends to store to the cache line, the fetch access ownership indicating that the processor intends to fetch data from the cache line; and
      - based on the determined cache action being a release fetch access ownership action, releasing access ownership, the released access ownership indicating that the processor does not intend to access to the cache line.

11. The method according to claim 10, wherein the store access ownership indicates the cache line is not available to other processors, and wherein the fetch access ownership indicates the cache line may be shared by other processors.

12. The method according to claim 11, wherein the prefetch data machine instruction further comprises an option field and operand information, wherein the function of the prefetch data machine instruction further comprises:
- interpreting the option field to determine whether to perform the data prefetch cache action or the cache line ownership operation;
- determining from said operand information, the address of the operand; and
- based on the determined cache action being a data prefetch action, prefetching said operand into said cache line of said cache.

13. The method according to claim 12, wherein the cache action comprises:
- based on the option field being a first value, performing no cache action;
- based on the option field being a second value, prefetching to the cache, data specified by the operand address for fetch access ownership wherein the cache line access ownership is set as fetch access ownership; and
- based on the option field being a third value, prefetching to the cache, data specified by the operand address for store access ownership wherein the cache line access ownership is set as store access ownership.

14. The method according to claim 12, wherein the cache action comprises:
- based on the option field being a fourth value and store access ownership being available, prefetching to the cache, data specified by the operand address for store access ownership wherein the cache line access ownership is set as store access ownership; and
- based on the option field being the fourth value and store access ownership being not-available, prefetching to the cache, data specified by the operand address for store access ownership wherein the cache line access ownership is set as fetch access ownership.

15. The method according to claim 10, the executing further comprising:
- based on the determined cache action being a modified access ownership action, changing access ownership of the cache line to indicate the cache line has been modified; and
- based on the determined cache action being an owned access ownership action, changing access ownership of the cache line to indicate the cache line is owned.

16. The method according to claim 10, wherein the prefetch data machine instruction further comprises a signed immediate field, wherein the address of the operand in memory is related to a memory address of the prefetch instruction being executed, comprising adding a halfword aligned sign extended value of the signed immediate field of the instruction to a program address of the prefetch data instruction being executed to determine the address of the operand in memory.

17. The method according to claim 10, wherein access ownership is MOESI protocol, wherein said cache line is resident in a cache of a processor executing the instruction, said cache action comprising any one of:
- changing cache ownership from modified to any one of owned, exclusive, shared or invalid,
- changing cache ownership from owned to any one of modified, exclusive, shared or invalid,
- changing cache ownership from exclusive to any one of modified, owned, shared or invalid, or
- changing cache ownership from shared to any one of modified, owned, exclusive or invalid.

18. The method according to claim 10, further comprising interpreting the prefetch data machine instruction to identify a predetermined software routine for emulating operation of the prefetch data machine instruction; and
wherein the executing the prefetch data machine instruction comprises executing the predetermined software routine to execute the prefetch data machine instruction.

* * * * *